Patented Nov. 16, 1943

2,334,192

UNITED STATES PATENT OFFICE 2,334,192

PREPARATION OF ALPHA-CYANO-BUTADIENE

William E. Hanford, Wilmington, Del., assignor to E. I. du Pont de Nemours & Company, Wilmington, Del., a corporation of Delaware No Drawing. Application March 19, 1941,
Serial No. 384,207

3 Claims. (Cl. 260—464)

This invention relates to the manufacture of chemical compounds and more particularly to the preparation of 1-cyano-1,3-butadiene.

Although numerous processes have been proposed previously for the preparation of 1-cyano-1,3-butadiene, none of these methods has described the preparation of this compound from readily available intermediates by a direct economic procedure.

This invention has as an object a new and improved method for the direct and economic syntheses of 1-cyano-1,3-butadiene. Other objects will appear hereinafter.

These objects are accomplished by dehydrating tetrahydrofuramide or its equivalents.

In the preferred method of practicing the invention the alpha- or 1-cyano-1,3-butadiene, is prepared by bringing tetrahydrofuramide into contact with a dehydration-type catalyst at an elevated temperature.

The invention is further illustrated by the following example in which the parts are by weight unless otherwise stated.

Example I

A catalyst tube packed with 189 parts by volume of phosphated alumina hydrate is heated to 450° C. and through the heated tube is passed 107.4 parts of tetrahydrofuramide in 1.57 hours. Under these conditions the rate of passage of the tetrahydrofuramide over the catalyst is 68.4 parts per hour and the contact time is 5.7 seconds. In traversing the catalyst the tetrahydrofuramide is converted into a liquid product which is fractionally distilled to yield two fractions, one boiling at 37° to 44° C. at 20 mm. (refractive index at 21° C. 1.4560) and the other at 44° to 49° C. at 20 mm. (refractive index at 21° C. 1.4822). The known boiling point of 1-cyano-1,3-butadiene is 42° to 46° C. at 22 mm. and the refractive index at 20° C. is 1.4880.

The phosphated alumina hydrate catalyst as commercially obtained has the following composition:

| | Per cent |
|---|---|
| $Al_2O_3$ | 38 to 40 |
| $SO_3$ | 10 to 14 |
| $P_2O_5$ | 15 to 17 |
| $Na_2O$ | 0.1 to 0.2 |
| Fe | 0.03 to 0.048 |

The process can be operated at temperatures from 275° to 600° C. Temperatures of 400° to 500° C. are preferred because below 400° C. the conversion is incomplete and at temperatures substantially above 500° C. decomposition reactions begin to predominate and reduce the yield of desired product.

In addition to temperature, the variables of space velocity, contact time, and catalyst volume can be varied somewhat from the conditions mentioned in the example.

The space velocity is a measure of the rate at which the gaseous reactants pass through the catalyst and is defined as the number of volumes of gas calculated at standard conditions, that traverse one volume of catalyst during one hour. Time of contact is defined as the time in seconds required for the gaseous reactants to traverse the entire volume of the catalyst at the temperature and pressure of the reaction, assuming that no change in volume occurs. The time of contact is calculated from the space velocity by the following expression.

Time of contact in seconds=

$$\frac{273 \times 60 \times 60}{(273 + \text{temp. in °C.}) \times \text{space velocity}}$$

The above mentioned variables, and particularly those of temperature, contact time and space velocity, are so interdependent and closely related that deviations in any one of these factors beyond that which can be compensated in the others can cause difficulty in the successful operation of the process.

The catalysts used in the practice of this invention are the oxides and salts of elements of the third, fourth, fifth, sixth, and eighth groups of the periodic table which are known to be useful as dehydration catalysts. Examples of these compounds are the dehydrating oxides of aluminum, silicon, tungsten, titanium, and molybdenum, thoria, vanadium oxide-on-alumdum, beryllium oxide-on-carbon, zirconium oxide-on-carbon, basic aluminum sulfate, and the borophosphoric acids described in U. S. Patent 2,200,734. The catalysts are preferably employed in the form of hard porous non-crystalline gels that are unaffected by high temperature and continuous contact with the reaction vapors. A catalyst can be used either in the pure state or admixed with other catalysts and promoters. Acidic catalysts such as phosphotungstic and phosphomolybdic acids or their anhydrides supported on suitable porous materials such as silica gel, pumice and kieselguhr can be employed. Other suitable catalysts are phosphotungstic acid-on-silica gel, disodium butylamine phosphate and the like.

Although the processes of this invention are preferably carried out using tetrahydrofuramide, as the raw material, in place thereof there may be used ammonium tetrahydrofuroate, tetrahydrofuronitrile or a mixture of tetrahydrofuroic acid, its anhydride, esters, or acid halide with ammonia. These materials can be introduced into the reaction chamber either as powdered solids, liquids, gases, or in solution in an inert volatile organic solvent, e. g. xylene, toluene, etc., depending upon their physical properties.

The reaction can be carried out at super- or sub-atmospheric pressures but operation at ordinary atmospheric pressure is preferred.

The dehydration of the tetrahydrofuramide or its equivalents to 1-cyano-1,3-butadiene can be effected chemically, if desired, by heating the amide either with phosphorus pentoxide, phosphorus pentachloride, or anhydrous potassium acid sulfate.

The preparation of 1-cyano-1,3-butadiene from tetrahydrofuramide in accordance with this invention presents several economic and technical advantages over previous methods. By means of this invention 1-cyano-1,3-butadiene is synthesized from a readily available intermediate by a simple, direct and continuous procedure.

The product of this invention, 1-cyano-1,3-butadiene, is of particular value in the preparation of resins having rubber-like properties. It can be polymerized or interpolymerized by any of the methods used in the polymerization of such butadiene compounds to give useful polymeric products.

As many apparently widely different embodiments of this invention may be made without departing from the spirit and scope thereof, it is to be understood that I do not limit myself to the specific embodiments thereof except as defined in the appended claims.

I claim:

1. A process for preparing 1-cyano-1,3-butadiene which comprises passing tetrahydrofuramide over a dehydration-type catalyst which is a member of the group consisting of the oxides and salts of elements of the third, fourth, fifth, sixth and eighth groups of the periodic table heated to between 275° and 600° C.

2. The process set forth in claim 1 in which said temperature is from 400° C. to 500° C.

3. A process for preparing 1-cyano-1,3-butadiene which comprises passing over a dehydration-type catalyst a compound which is a member of the group consisting of tetrahydrofuramide, tetrahydrofuronitrile, ammonium tetrahydrofuroate, and mixtures of ammonia with tetrahydrofuroic acid, its esters, acid halides, and anhydride, said catalyst being a member of the group consisting of the oxides and salts of elements of the third, fourth, fifth, sixth and eighth groups of the periodic table heated to between 275° and 600° C.

WILLIAM E. HANFORD.